(12) United States Patent
Kitamura et al.

(10) Patent No.: US 10,309,502 B2
(45) Date of Patent: Jun. 4, 2019

(54) POWER STEERING DEVICE

(71) Applicant: HITACHI AUTOMOTIVE SYSTEMS, LTD., Hitachinaka-shi, Ibaraki (JP)

(72) Inventors: Keisuke Kitamura, Atsugi (JP); Osamu Yoshida, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 128 days.

(21) Appl. No.: 15/542,312

(22) PCT Filed: Nov. 27, 2015

(86) PCT No.: PCT/JP2015/083389
§ 371 (c)(1),
(2) Date: Jul. 7, 2017

(87) PCT Pub. No.: WO2016/114022
PCT Pub. Date: Jul. 21, 2016

(65) Prior Publication Data
US 2018/0274641 A1    Sep. 27, 2018

(30) Foreign Application Priority Data

Jan. 16, 2015 (JP) .................................. 2015-006382

(51) Int. Cl.
*B62D 5/04* (2006.01)
*F16H 25/22* (2006.01)
(Continued)

(52) U.S. Cl.
CPC .......... *F16H 25/2223* (2013.01); *B21J 5/025* (2013.01); *B62D 5/0424* (2013.01);
(Continued)

(58) Field of Classification Search
CPC .. B62D 5/0442; B62D 5/0445; B62D 5/0448; F16H 25/2214
See application file for complete search history.

(56) References Cited

U.S. PATENT DOCUMENTS 6,244,125 B1   6/2001   Sano
6,282,972 B2   9/2001   Kuramochi et al.
(Continued)

FOREIGN PATENT DOCUMENTS

JP    S57-38829 B2    8/1982
JP    H06-69502 U     9/1994
(Continued)

OTHER PUBLICATIONS

International Search Report and Written Opinion issued in parent application PCT/JP2015/083389, dated Feb. 16, 2016, 9 pages.
(Continued)

*Primary Examiner* — Kevin Hurley
(74) *Attorney, Agent, or Firm* — Foley & Lardner LLP

(57) ABSTRACT

A first member (81) including a first opening portion that opens to one side in a circumferential direction around an axis of a rack shaft corresponding to a rotation axis of a nut, and a second member (82) including a second opening portion that confronts the first opening portion, and that opens to the other side in the circumferential direction, are molded so that a first insertion portion (71) and a second insertion portion (72) are inclined along a lead angle of a ball circulation groove with respect to a connection portion (73), and the first and second openings are joined in an abutted state, thereby forming a tube (44).

20 Claims, 13 Drawing Sheets

(51) Int. Cl.
*B21J 5/02* (2006.01)
*F16H 25/20* (2006.01)

(52) U.S. Cl.
CPC ....... *B62D 5/0448* (2013.01); *F16H 25/2214* (2013.01); *F16H 2025/2081* (2013.01); *F16H 2025/2096* (2013.01)

(56) References Cited

U.S. PATENT DOCUMENTS

| | | | |
|---|---|---|---|
| 6,450,055 | B1 | 9/2002 | Sekiya et al. |
| 6,978,693 | B2 | 12/2005 | Ohkubo |
| 9,314,835 | B2 | 4/2016 | Kitamura et al. |
| 9,346,485 | B2 * | 5/2016 | Muto ................... B62D 5/0448 |
| 9,568,078 | B2 | 2/2017 | Suzuki |
| 2002/0023513 | A1 | 2/2002 | Sekiya et al. |
| 2007/0006676 | A1 | 1/2007 | Mizuhara et al. |
| 2009/0260468 | A1 | 10/2009 | Tachikake |
| 2014/0284133 | A1 | 9/2014 | Muto et al. |
| 2014/0284134 | A1 | 9/2014 | Kitamura et al. |
| 2016/0207560 | A1 | 7/2016 | Muto et al. |
| 2017/0174253 | A1 * | 6/2017 | Kitamura ............. B62D 5/0448 |
| 2018/0149245 | A1 * | 5/2018 | Yamashita .......... F16H 25/2214 |

FOREIGN PATENT DOCUMENTS

| | | |
|---|---|---|
| JP | 2001-141019 A | 5/2001 |
| JP | 2003-172422 A | 6/2003 |
| JP | 2004-353835 A | 12/2004 |
| JP | 2005-076652 A | 3/2005 |
| JP | 2005-249046 A | 9/2005 |
| JP | 2013-024318 A | 2/2013 |
| JP | 2014-185724 A | 10/2014 |
| WO | WO-2014/192595 A1 | 12/2014 |
| WO | WO-2016/114021 A1 | 7/2016 |

OTHER PUBLICATIONS

U.S. Appl. No. 15/543,772, filed Jul. 14, 2017, Yoshida et al.
International Search Report and Written Opinion issued in International Application PCT/JP2015/083388, dated Jan. 26, 2016, 11 pages.
Yoshida: Non-Final Office Action issued in U.S. Appl. No. 15/543,772, dated Oct. 11, 2018, 11 pages.
YOSHIDA: Notice of Allowance in U.S. Appl. No. 15/543,772 dated Mar. 27, 2019.

* cited by examiner

POWER STEERING DEVICE

TECHNICAL FIELD

This invention relates to a power steering device of a rack assist type which is applied to, for example, a vehicle, and which is arranged to assist a movement of a rack shaft by a rotation force of a motor that is transmitted through a ball screw.

BACKGROUND ART

There is known a conventional power steering device of a rack assist type such as a below-described patent document 1.

That is, in this ball screw, a plurality balls which are rolling members are circulated through a tube between a pair of ball screw grooves formed on inner and outer circumference portions of a screw shaft and the nut to confront each other. A connection portion between a ball inlet and outlet holes provided in the nut and the ball screw groove (nut side ball screw groove) is processed into a diameter increasing tapered shape. With this, a smooth movement of the balls between the tube and the ball screw groove is ensured.

PRIOR ART DOCUMENT

Patent Document

Patent Document 1: Japanese Patent Application Publication No. 2001-141019

SUMMARY OF THE INVENTION

Problems which the Invention is Intended to Solve

However, in the conventional ball screw, the ball screw groove is formed to have a lead angle. On the other hand, the tube is formed along the circumferential direction of the rotation axis of the nut. Accordingly, smooth movements of the balls between the tube and the ball screw groove cannot be ensured.

It is, therefore, an object of the present invention to provide a power steering device and a manufacturing method thereof devised to solve the above-described problems, and to ensure a smooth movement of a ball between a tube and a ball screw groove.

Means for Solving the Problem

Specifically, in the present invention, a connection member connecting a first connection passage opened on one end side of a ball circulation groove opened on a nut, a second connection passage opened on the other end side of the ball circulation groove to circulate the balls between the first connection passage and the second connection passage is constituted by joining a first member which includes a first opening portion opened on one side in a circumferential direction around a rotation axis of the nut, and a second member which includes a second opening portion that confronts the first opening, and that is opened on the other side in the circumferential direction. The connection member in the joint state including a first insertion portion inserted into the first connection passage, a second insertion portion inserted into the second connection passage, and a connection portion connecting the first insertion portion and the second insertion portion. The first insertion portion and the second insertion portion are inclined along a lead angle of the ball circulation groove with respect to the connection portion.

Benefit of the Invention

In the present invention, the insertion portions of the connection member are along the lead angle of the ball circulation groove. Accordingly, it is possible to smooth the movements of the balls between the connection member and the ball circulation groove.

Moreover, the connection member divided in the circumferential direction are formed by the die forming. Accordingly, it is possible to readily form the connection member, and thereby to improve the productivity and to decrease the manufacturing cost.

BRIEF DESCRIPTION OF DRAWINGS

FIG. 16(*a*) is a view before a first molding. FIG. 16(*b*) is a view after the first molding. FIG. 16(*c*) is a view after a second molding.

DESCRIPTION OF EMBODIMENTS

Hereinafter, a power steering device according to one embodiment of the present invention is explained with reference to the drawings. Besides, in the below-described embodiment, the power steering device is applied to a steering device of a vehicle.

Figure 1:
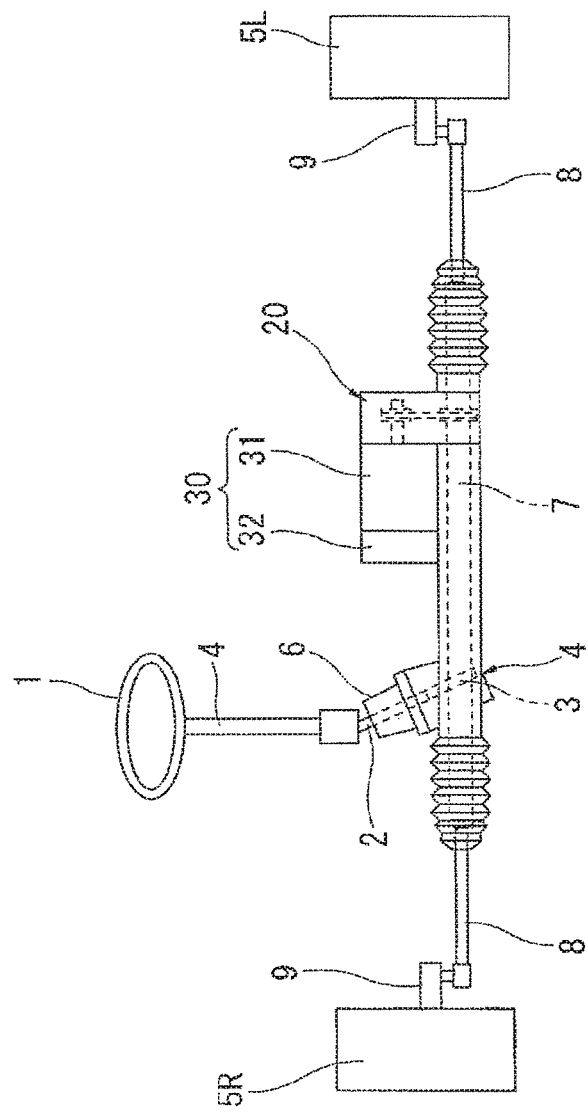
FIG. 1 is a schematic view showing a power steering device according to the present invention.

That is, as shown in FIG. 1, this power steering device includes an input shaft 2 including one end side linked with a steering wheel 1 to rotate as a unit with the steering wheel 1; an output shaft 3 including one end side connected through a torsion bar (not shown) to the other end side of the input shaft 2 to be rotated relative to the other end side of the input shaft 2, and the other end side connected through a rack and pinion mechanism 4 to steered wheels 5L and 5R;

a torque sensor 6 disposed on an outer circumference side of the input shaft 2, and arranged to sense a steering torque based on a relative rotation displacement amount between the input shaft 2 and the output shaft 3; a motor unit 30 arranged to provide a steering assist torque according to a steering torque of a driver based on detection results such as the torque sensor 6 and a vehicle speed sensor (not shown), to a rack shaft 7 described later; and a transmitting mechanism 20 arranged decrease a speed of an output (rotation force) of the motor unit 30, to convert the output into an axial movement force of the rack shaft 7 described later, and to transmit the axial movement force.

The rack and pinion mechanism 4 includes pinion teeth (not shown) formed on an outer circumference of one end portion of the output shaft 3; and rack teeth (not shown) formed in an axial predetermined range of the rack shaft 7 which is a steered (turning) shaft which is disposed to the one end portion of the output shaft 3 substantially perpendicular to the one end portion of the output shaft 3, and which is engaged with the pinion teeth. The rack shaft 7 is arranged to be moved in the axial directions in accordance with the rotation direction of the output shaft 3. Respective ends of the rack shaft 7 are linked, respectively, through tie rods 8 and 8 and knuckle arms 9 and 9 to the steered wheels 5R and 5L. The rack shaft 7 is arranged to be moved in the axial direction to pull the knuckle arms 9 and 9 through the tie rods 8 and 8, and thereby to vary directions of the steered wheels 5R and 5L.

Figure 2:
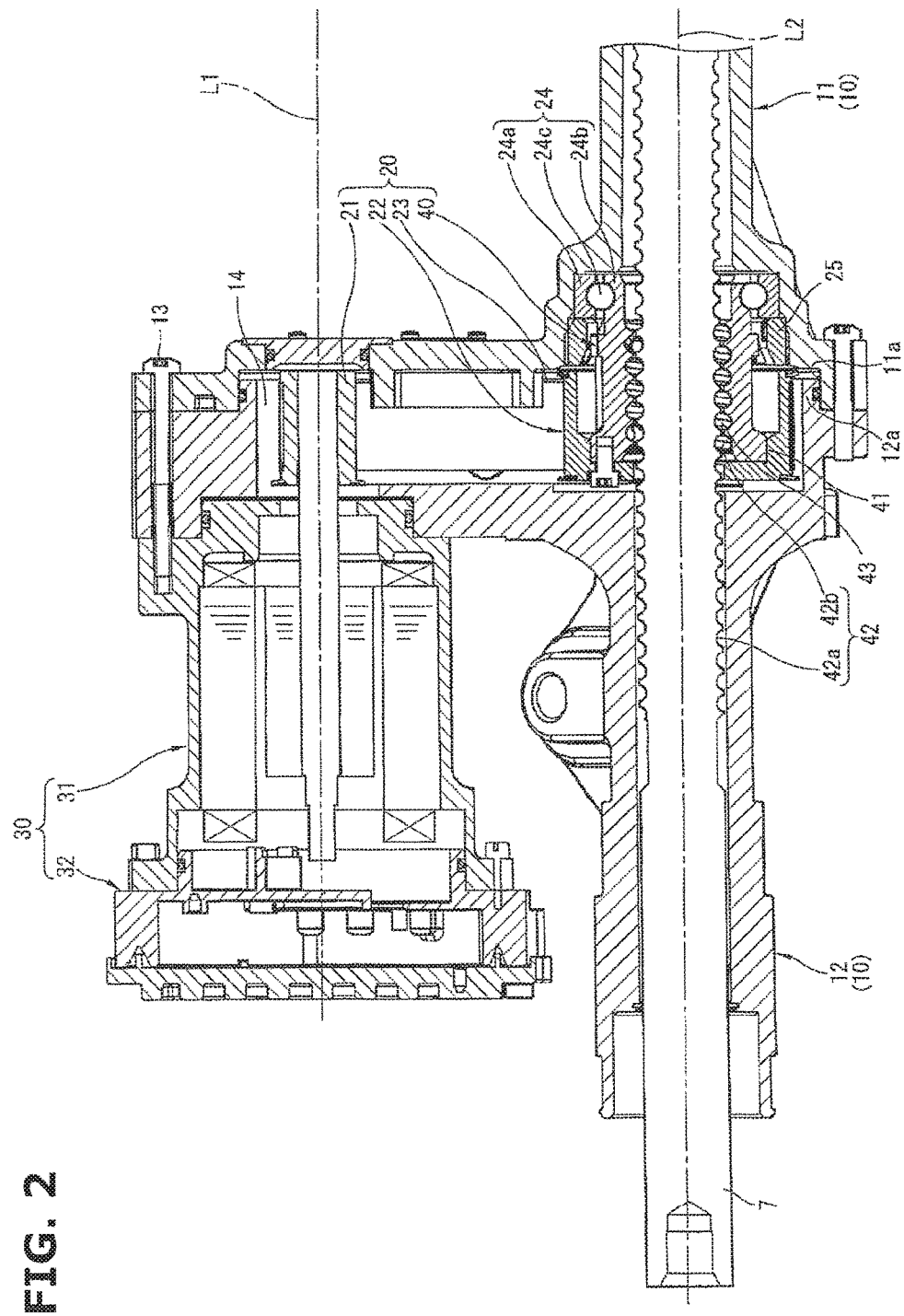
FIG. 2 is an enlarged sectional view showing a portion near a motor unit shown in FIG. 1.

As shown in FIG. 1 and FIG. 2, the rack shaft 7 is received within a gear housing 10 to be moved in the axial direction. The gear housing 10 includes a first gear housing 11 receiving the rack and pinion mechanism 4; and a second gear housing 12 receiving the transmitting mechanism 20. The gear housing 10 is constituted by integrating the first gear housing 11 and the second gear housing 12. The first housing 11 and the second housing 12 are fixed together with the motor unit 30 by being tightened by a plurality of bolts 13 (three in this embodiment) tightening the gear housing 10 and the motor unit 30, in a state where a raised portion 12a protruding on a joint end portion of the second housing 12 is mounted in a recessed portion 11a formed in a joint end portion of the first gear housing 11.

As shown in FIG. 2, the transmitting mechanism 20 includes an input side pulley 21 provided to an outer circumference of a tip end portion of an output shaft 31a of an electric motor 31 described later to rotate as a unit with the output shaft 31a of the electric motor 31, and arranged to rotate about an axis L of the output shaft 31a; an output side pulley 22 provided to the outer circumference of the rack shaft 7 to be rotated relative to the outer circumference of the rack shaft 7, and arranged to be rotated about an axis L2 of the rack shaft 7 based on the rotation force (torque) of the input side pulley 21; a ball screw 40 disposed between the output shaft side pulley 22 and the rack shaft 7, and arranged to decrease a speed of the rotation of the output side pulley 22, and to convert the speed-decreased rotation to the axial movement of the rack shaft 7; and a belt 23 wound around the input side pulley 21 and the output side pulley 22, and arranged to transmit the rotation of the input side pulley 21 to the output side pulley 22, and thereby to synchronously rotate the both pulleys 21 and 22. The transmitting mechanism 20 is received within a transmitting mechanism receiving portion 14 defined between the joint end portions of the both gear housings 11 and 12.

Figure 3:
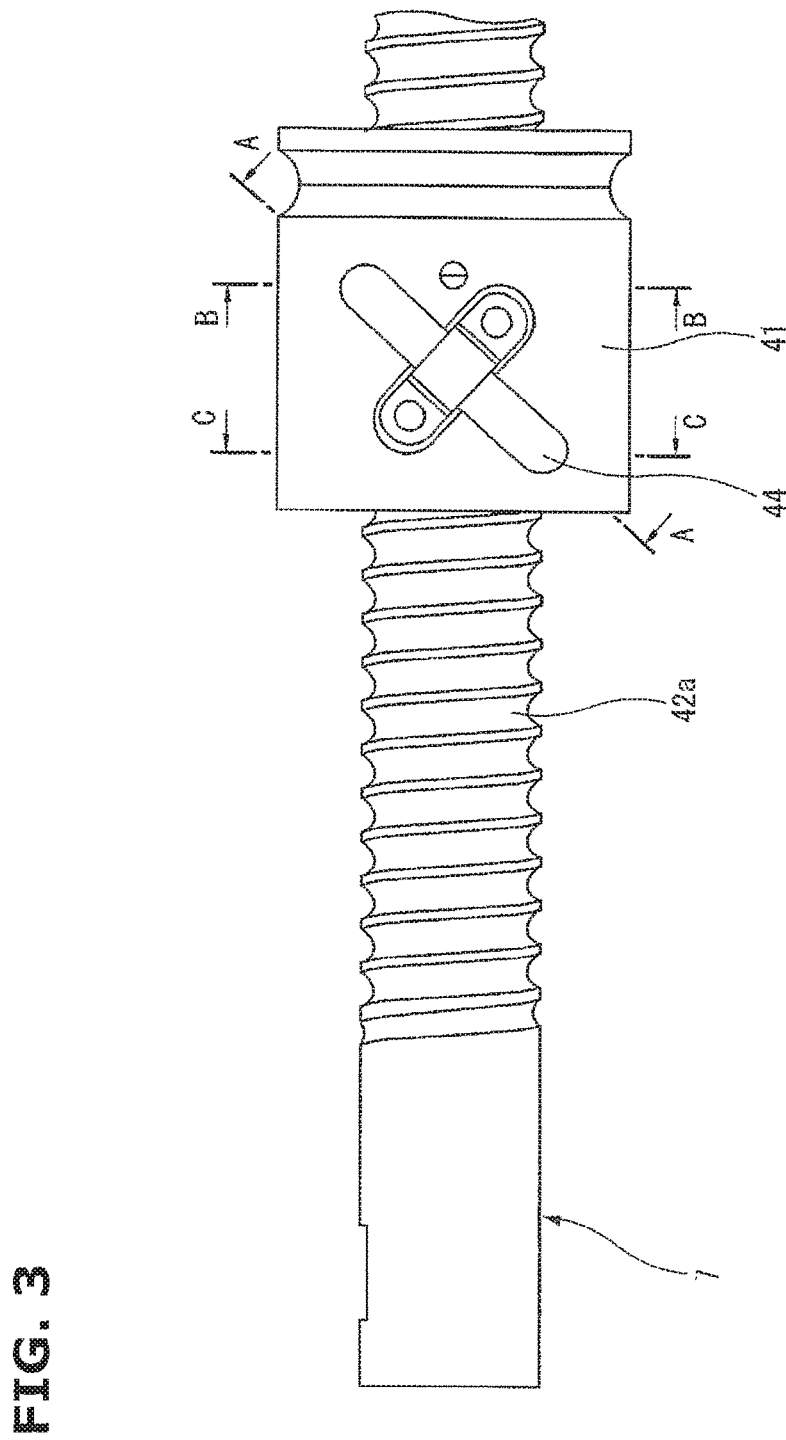
FIG. 3 is a plan view showing a ball screw of FIG. 2.
Figure 4:
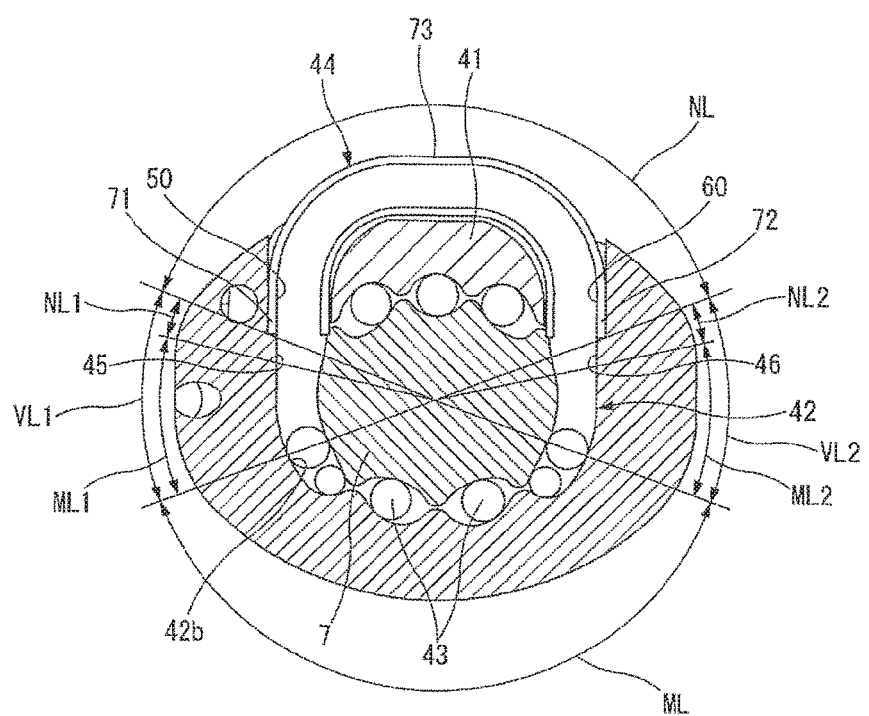
FIG. 4 is a sectional view taken along an A-A line of FIG. 3.

As shown in FIG. 2 to FIG. 4, the ball screw 40 includes a nut 41 formed into a cylindrical shape surrounding the rack shaft 7, and provided to be rotated relative to the rack shaft 7; a ball circulation groove 42 that has a predetermined lead angle, and that is constituted by a shaft side ball screw groove 42a which has a helical shape, and which is provided on the outer circumference of the rack shaft 7, and a nut side ball screw groove 42b which has a helical shape, and which is provided on an inner circumference of the nut 41; a plurality of balls 43 disposed within the ball circulation groove 42 to be rolled within the ball circulation groove 42; and a tube 44 which is a cylindrical connection member, which connects both ends of the ball circulation groove 42, and which is arranged to circulate the balls 43 between the both end portions of the ball circulation groove 42.

The nut 41 includes an axial one end portion rotatably supported by the first gear housing 11 through a ball bearing 24; and the other end portion having an outer circumference surface on which the output side pulley 22 is mounted and fixed. Besides, the ball bearing 24 includes an inner wheel 24a integrally constituted with the nut 41; an outer wheel 24b which is press-fit in the inner circumference surface of the first gear housing 11, and which is tightened by a lock nut 25; and a plurality of balls 24c disposed between the inner wheel 24a and the outer wheel 24b to be rolled between the inner wheel 24a and the outer wheel 24b. A predetermined grease is applied between the ball screw grooves 42a and 42b, and between the inner and outer wheels 24a and 24b, for lubricating the friction according to the rolling movements of the balls 43 and 24c.

Figure 5:
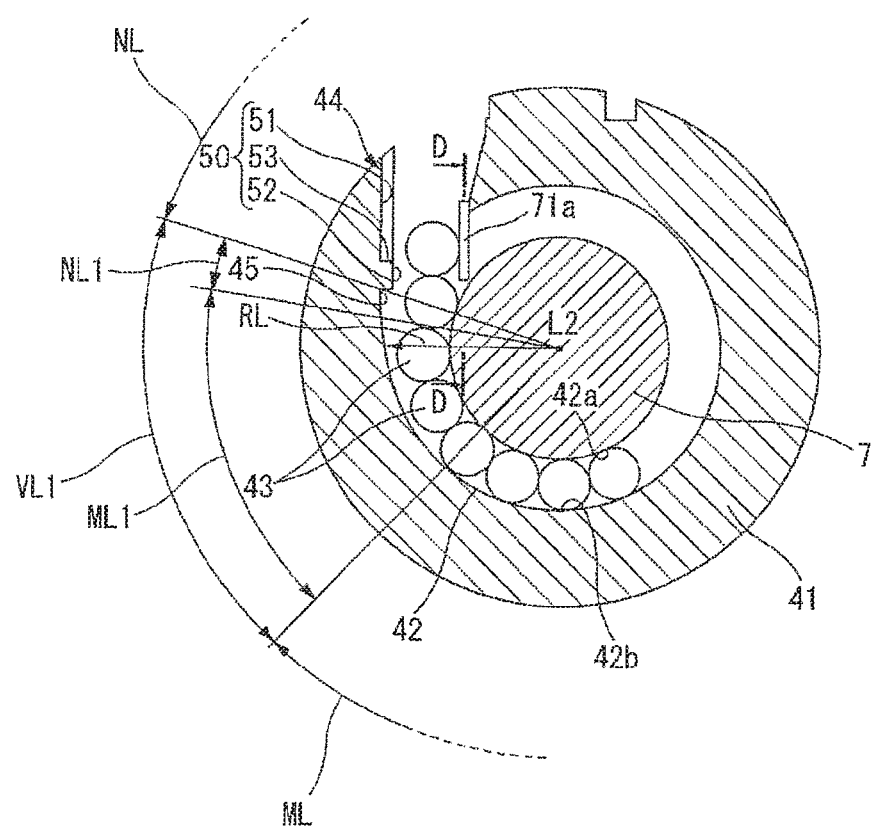
FIG. 5 is a sectional view taken along a B-B line of FIG. 3.
Figure 6:
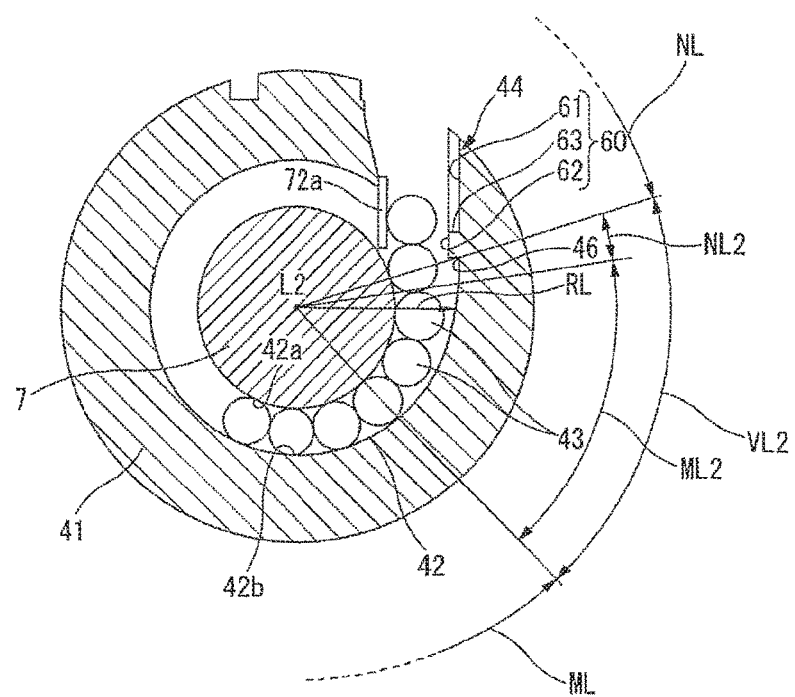
FIG. 6 is a sectional view taken along a C-C line of FIG. 3.
Figure 7:
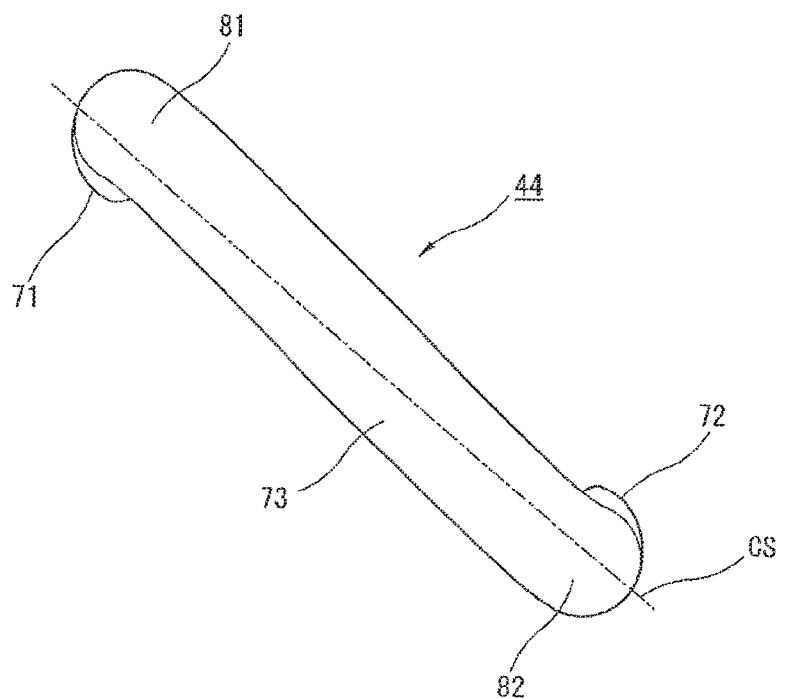
FIG. 7 is a plan view showing a tube shown in FIG. 3.

Moreover, as shown in FIG. 4 to FIG. 6, the nut 41 includes a first connection passage 50 which is formed at an axial one end side thereof to penetrate through the nut 41, which is connected to the one end portion of the tube 44, which is arranged to supply or discharge the balls 43 to the ball circulation groove 42, and which is opened to the one end portion of the ball circulation groove 42 (the nut side ball screw groove 42b). Similarly, the nut 41 includes a second connection passage 60 which is formed at an axial other end side thereof to penetrate through the nut 41, which is connected to the other end portion of the tube 44, which is arranged to supply or discharge the balls 43 from the ball circulation groove 42, and which is opened to the other end portion of the ball circulation groove 42 (the nut side ball screw groove 42b).

The first and second connection passages 50 and 60 include, respectively, first and second large diameter portions 51 and 61 formed on the one end sides to be opened to the outer circumference surfaces of the nut 41, and arranged to connect the tube 44; and a first small diameter portion 52 and a second small diameter portion 62 which are formed into stepped diameter decreasing shapes to decrease diameters from the first and second large diameter portions 51 and 61 toward the other end side, and opened to the inner circumference surface (the nut side ball screw groove 42b) of the nut 41. Moreover, a first stepped portion 53 is formed between the first large diameter portion 51 and the first small diameter portion 52. A second stepped portion 63 is formed between the second large diameter portion 61 and the second small diameter portion 62. Besides, an input on the nut 41 side is not acted to a region constituted by the first and second connection passages 50 and 60, and the tube 44. Accordingly, the region constituted by the first and second connection passages 50 and 60, and the tube 44 is a no load region NL in which the input of the nut 41 side is not transmitted to the rack shaft 7.

The ball circulation groove 42 includes an intermediate portion having a constant inside diameter substantially identical to a diameter of the balls 43. The ball circulation groove 42 is constituted as a load region ML in which the input from the nut 41 side can be sufficiently transmitted through the balls 43 to the rack shaft 47 side. Moreover, a first predetermined region and a second predetermined region which are predetermined regions on the both end sides of the ball circulation groove 42 are transition regions between the no load region NL and the load region ML. The first predetermined region and the second predetermined region are constituted as first and second load transition regions VL1 and VL2 in which the input load transmitted from the nut 41 side to the rack shaft 7 side can be varied (Increased or decreased).

The first and second load transition regions VL1 and VL2 are constituted by the shaft side ball screw groove 42a which has a constant depth substantially identical to a radius of the ball 43, and which has a substantially arc cross section, and the nut side ball screw groove 42b including a first taper portion 45 and a second taper portion 46 in which radial direction distances RL from the axis L2 of the rack shaft 7 corresponding to the rotation axis of the nut 41 are gradually increased toward the other end side openings of the first and second connection passages 50 and 60.

In this case, the first and second taper portions 45 and 46 are constituted by varying only a distance to the center of curvature of the arc surface (in particular, being offset in the radial outward direction) so that the shapes of the arc surfaces which are the cross section surfaces of the nut side ball screw grooves 42b are identical. This center of the curvature distance is gradually varied along the moving direction of the balls 43, that is, along a lead angle of the ball circulation groove 42.

Moreover, the first and second load transition regions VL1 and VL2 Include a first load region ML1 and a second load region ML2 which are formed in a first region and a second region that are on the no load region ML's side of the first and second predetermined ranges constituted by the first and second taper portions 45 and 46, and in which at least a part of the load inputted from the nut 41 side can be transmitted to the rack 7 side; and a first no load region NL1 and a second no load region NL2 which are formed in residual regions, and in which the input from the nut 41 side cannot be transmitted to the rack shaft 7. The first and second load transition regions VL1 and VL2 pass from the other end side openings of the first and second connection passages 50 and 60 through the first and second no load regions NL1 and NL2, and then passes through the first and second load regions ML1 and ML2.

As shown in FIG. 3 to FIG. 6, the tube 44 has a cylindrical shape divided into substantially half dividing shapes along an extension direction thereof (a movement direction of the ball 43). The tube 44 includes a first insertion portion 71 inserted into the first large diameter portion 51; a second insertion portion 72 inserted into the second large diameter portion 61; and a connection portion 73 connecting the first insertion portion 71 and the second insertion portion 72. The tube 44 is formed so that the first insertion portion 71 and the second insertion portion 72 are inclined along the predetermined lead angle of the ball circulation groove 42 with respect to the connection portion 73.

In this case, the dividing structure of the tube 44 is explained in detail with reference to FIG. 7 to FIG. 15. As shown in FIG. 7 to FIG. 10, this tube 44 includes a first member 81 which is formed by die forming, and which has a first opening portion 81a that is continuously opened in an entire area in a longitudinal direction on the one side of the circumferential direction around the axis L2 of the rack shaft 7 that corresponds to the rotation axis of the nut 41; and a second member 82 which is formed by the die forming, and which has a second opening portion 82a that confronts the first opening portion 81a, and that is continuously opened in an entire area in a longitudinal direction on the other side of the circumferential direction. The tube 44 is formed into the substantially cylindrical shape by joining the first and second opening portions 81a and 82a in an abutted state.

As described above, in this tube 44, the first and second insertion portions 71 and 72 have the predetermined lead angles along the circumferential direction corresponding to the movement direction of the balls 43. The first and second members 81 and 82 are divided so that a joint surface CS between the first and second members 81 and 82 is inclined in the inclination direction of the first and second insertion portions 44a and 44b with respect to the movement direction of the balls 43 in the connection portion 44c. In particular, the tube 44 is divided by the single joint surface CS by which a first imaginary surface including a joint surface (hereinafter, referred to as "first joint surface") 81b of the first insertion portion 44a, and a second imaginary surface including a joint surface (hereinafter, referred to as "second joint surface") 82b of the second insertion 44b are in the same plane (flush with each other). Moreover, the tube 44 is divided so that the first member 81 and the second member 82 has the same shape.

Figure 8:
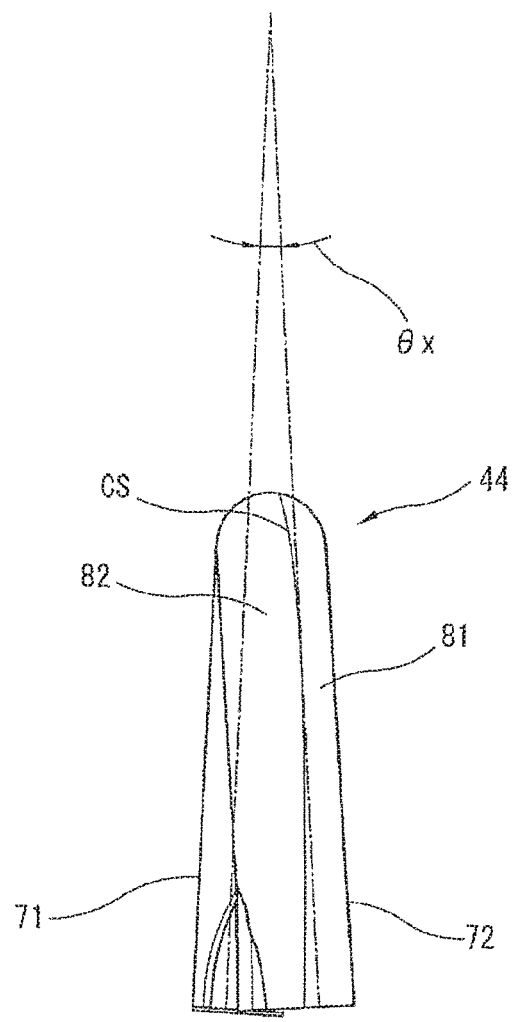
FIG. 8 is a side view showing the tube shown in FIG. 3.
Figure 9:
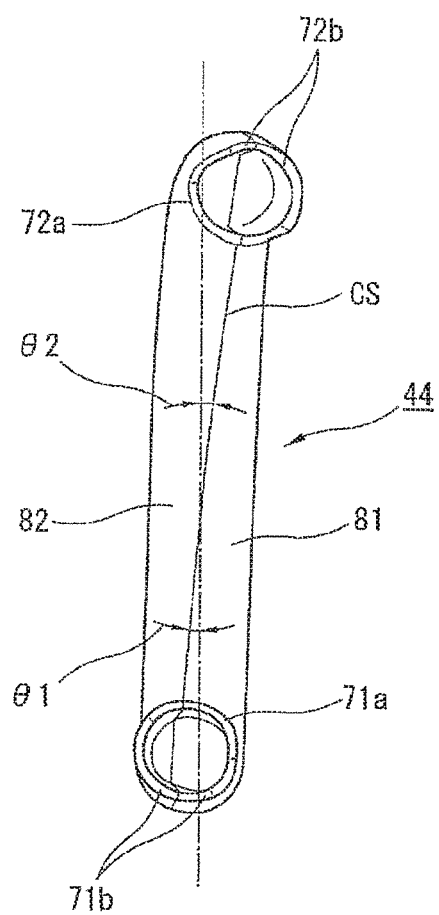
FIG. 9 is a bottom view showing the tube shown in FIG. 3.
Figure 10:
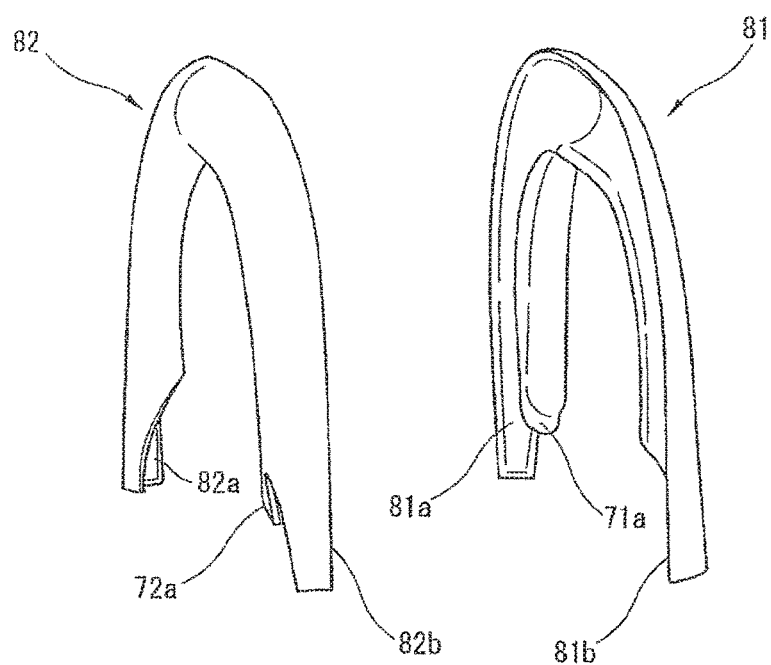
FIG. 10 is an exploded perspective view showing the tube shown in FIG. 3.

Besides, in this case, the tube 44 is formed so that a narrow angle θx formed by the first imaginary surface including the first joint surface 81b and the second imaginary surface including the second joint surface 82b as shown in FIG. 8 is smaller than the summation of an inclination angle θ1 of the first insertion portion 71 with respect to the connection portion 73 and an inclination angle θ2 of the second insertion portion 72 with respect to the connection portion 73 as shown in FIG. 9.

Figure 12:
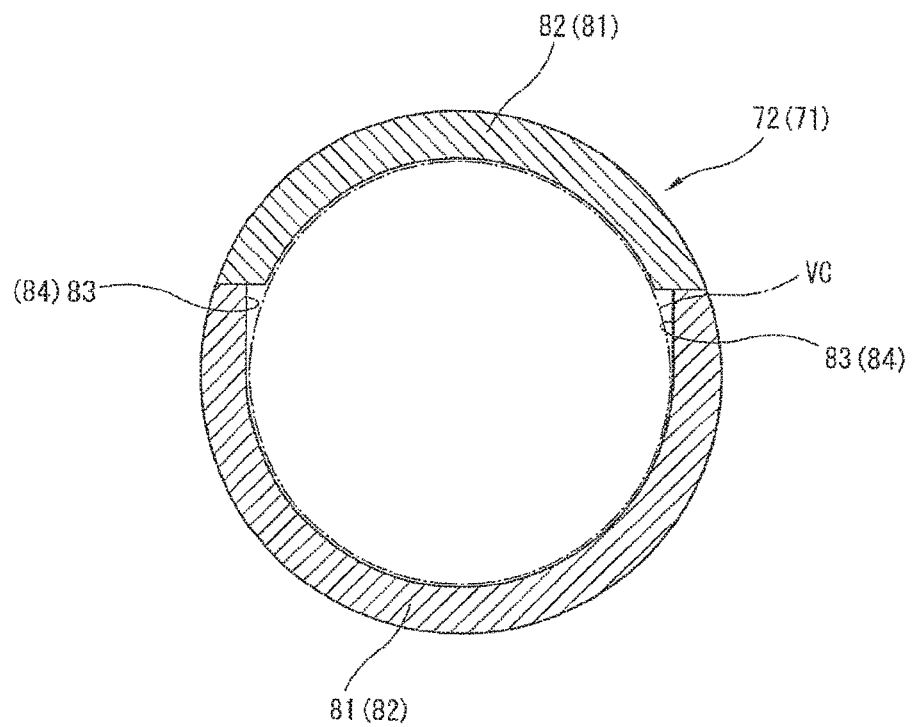
FIG. 12 is a lateral sectional view showing the first insertion portion of the tube shown in FIG. 11.

Based on this dividing configuration, the first member 81 includes a first undercut suppressing portion 83 provided in a predetermined range of the movement direction of the balls 43 in a predetermined region in which a circumferential length of the inner circumference edge in the cross section perpendicular to the movement direction is longer than the circumferential length of the second member 82, as shown in FIG. 12. The first undercut suppressing portion 83 is formed by enlarging the inner circumference edge on the first opening portion 81a side in the radially outside direction beyond the imaginary circle along the inner circumference edge of the tube 44, so as to suppress the undercut at the die forming. Moreover, the second member 82 includes a second undercut suppressing portion 84 identical to the first undercut suppressing portion 83.

Figure 13:
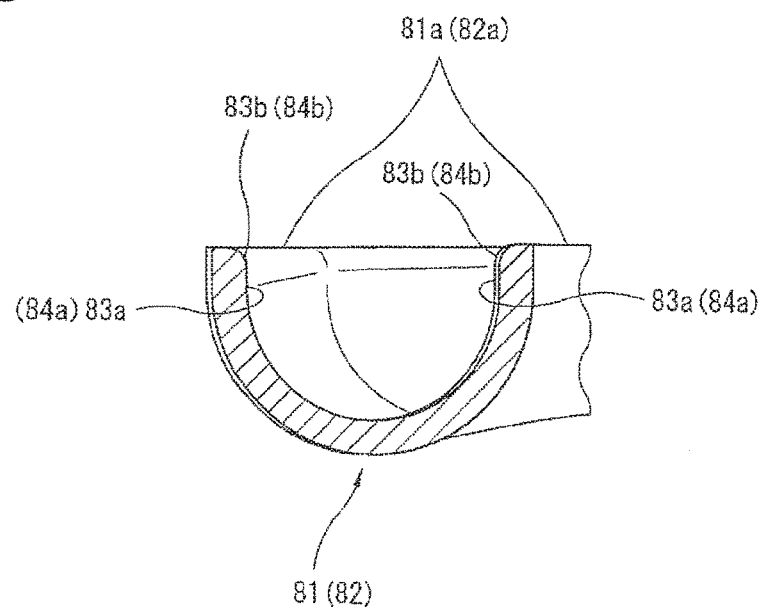
FIG. 13 is a perspective sectional view showing the first insertion portion of the first member shown in FIG. 12.
Figure 14:
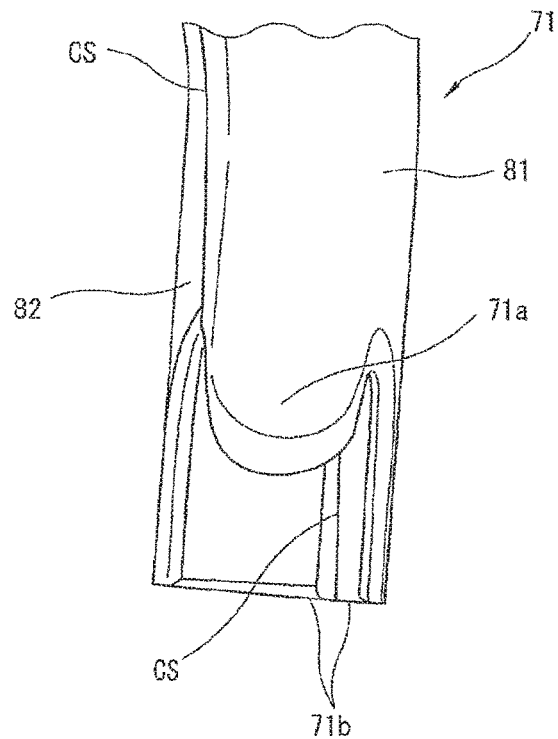
FIG. 14 is a view of a first guide portion of the first insertion portion shown in FIG. 9 when viewed from a front side.

These first and second undercut suppressing portions 83 and 84 are formed at the die forming (the press forming) of the first and second members 81 and 82, as described later. As shown in FIG. 13, the first and second undercut suppressing portions 83 and 84 include, respectively, a first flat portion 83a and a second flat portion 84a which are formed at the inner side edge portions of the first and second opening portions 81a and 82a, and which have linear cross sections; and a first taper portion 83b and a second taper portion 84b which are continuous with the inner side edges of the first and second opening portions 81a and 82a that are tip end edges of the first and second flat portions 83a and 84a, and which have arc cross sections.

Besides, in the first and second undercut suppressing section 83 and 84, the inner end portions of the first and second opening portions 81a and 82a are formed, respectively, into the flat shapes, as described above, as show in FIG. 12. In the counter (opposite) members (the first and second members 81 and 82) confronting the first and second undercut suppressing portion 83 and 84, the shapes of the inner circumference surfaces in the regions confronting the first and second undercut suppressing portions 83 and 84 are formed into shapes along the imaginary circle VC along the inner circumference edge of the tube 44.

Figure 11:
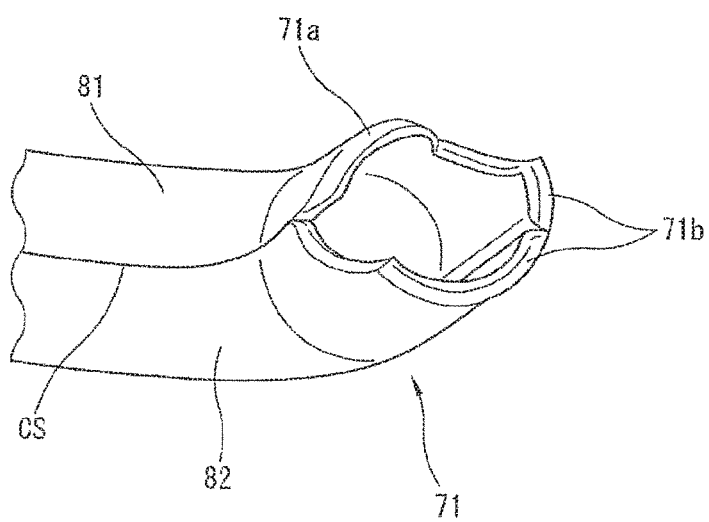
FIG. 11 is a perspective view showing a portion near a first insertion portion of the tube shown in FIG. 9.

Moreover, as shown in FIG. 12, the first insertion portion 71 includes a first guide portion 71a which is a first piece portion that is provided within a predetermined range in the circumferential direction (around the movement direction of the ball 43) on the shaft side ball screw groove 42a side, that is arranged to guide the movements of the balls 43 between the first small diameter portion 52 and the ball circulation groove 42, and that extends toward the shaft side ball screw groove 42a side. The second insertion portion 72 includes a second guide portion 72a which is a second piece portion that is provided within a predetermined range in the circumferential direction (around the movement direction of the ball 43) on the shaft side ball screw groove 42a side, that is arranged to guide the movements of the balls 43 between the second small diameter portion 62 and the ball circulation groove 42, and that extends toward the shaft side ball screw groove 42a. Moreover, as shown in FIG. 11, the first and second insertion portions 71 and 72 include a first abutment portion 71b and a second abutment portion 72b which are provided in residual circumferential regions that are apart from the first and second guide portions 71a and 72a, which are arranged to be abutted, respectively, on the first and second stepped portions 53 and 63, and thereby to restrict the insertion positions of the first and second insertion portions 71 and 72, and which are formed into substantially flat shapes. In this case, the first abutment portion 71b and the second abutment portion 72b are formed to extend across (over) the first and second members 81 and 82. The first member 81 includes the one end side abutted on the first stepped portion 53, and the other end side abutted on the second stepped portion 63. Furthermore, the second member 82 includes the one end side abutted on the first stepped portion 53, and the other end side abutted on the second stepped portion 63.

Figure 15:
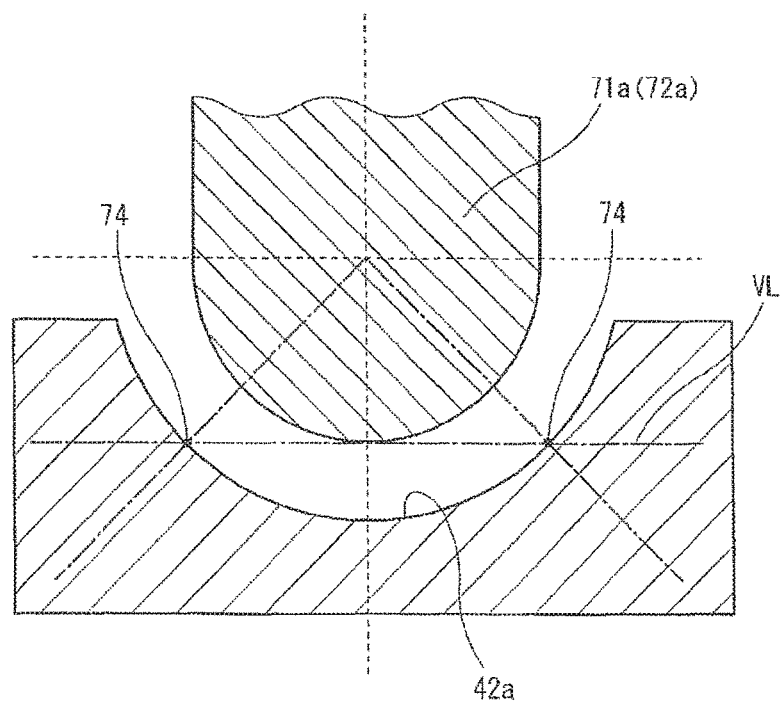
FIG. 15 is a sectional view taken along a D-D section line of FIG. 5.

In this case, as shown in FIG. 15, the first and second guide portions 71a and 72a are disposed on a counter-abutment portion side (the first and second connection passages 52 and 62 side) of an imaginary line VL connecting the pair of the abutment portions 74 and 74 at which the shaft side ball screw groove 42a is abutted on one of the balls 43. The first and second guide portions 71a and 72a have predetermined lengths (extension amounts) by which each of the first and second guide portions 71a and 72a does not reach the pair of the abutment portions 74 and 74. With this, it is possible to suppress the scraping of the grease by the first and second guide portions 71a and 72a at the pair of the abutment portions 74 and 74, and to ensure the smooth lubrication of the balls 43. Besides, the first guide portion 71a is provided only to the first member 81 side. The second guide portion 72a is provided only to the second member 82 side.

As shown in FIG. 2, the motor unit 30 includes an electric motor 31 that includes an axial one end side on which the output shaft 31a protrudes, and which is supported and fixed on the second gear housing 12, and that is arranged to drive and rotate the input side pulley 21, and thereby to generate a steering assist force through the transmitting mechanism 20 to the rack shaft 7; and an electric controller 32 provided to the other end side of the electric motor 31, and configured to drivinly control the electric motor 31 in accordance with predetermined parameters such as a steering torque and a vehicle speed. The motor unit 30 is constituted by integrating the electric motor 31 and the electric controller 32.

Figure 16:
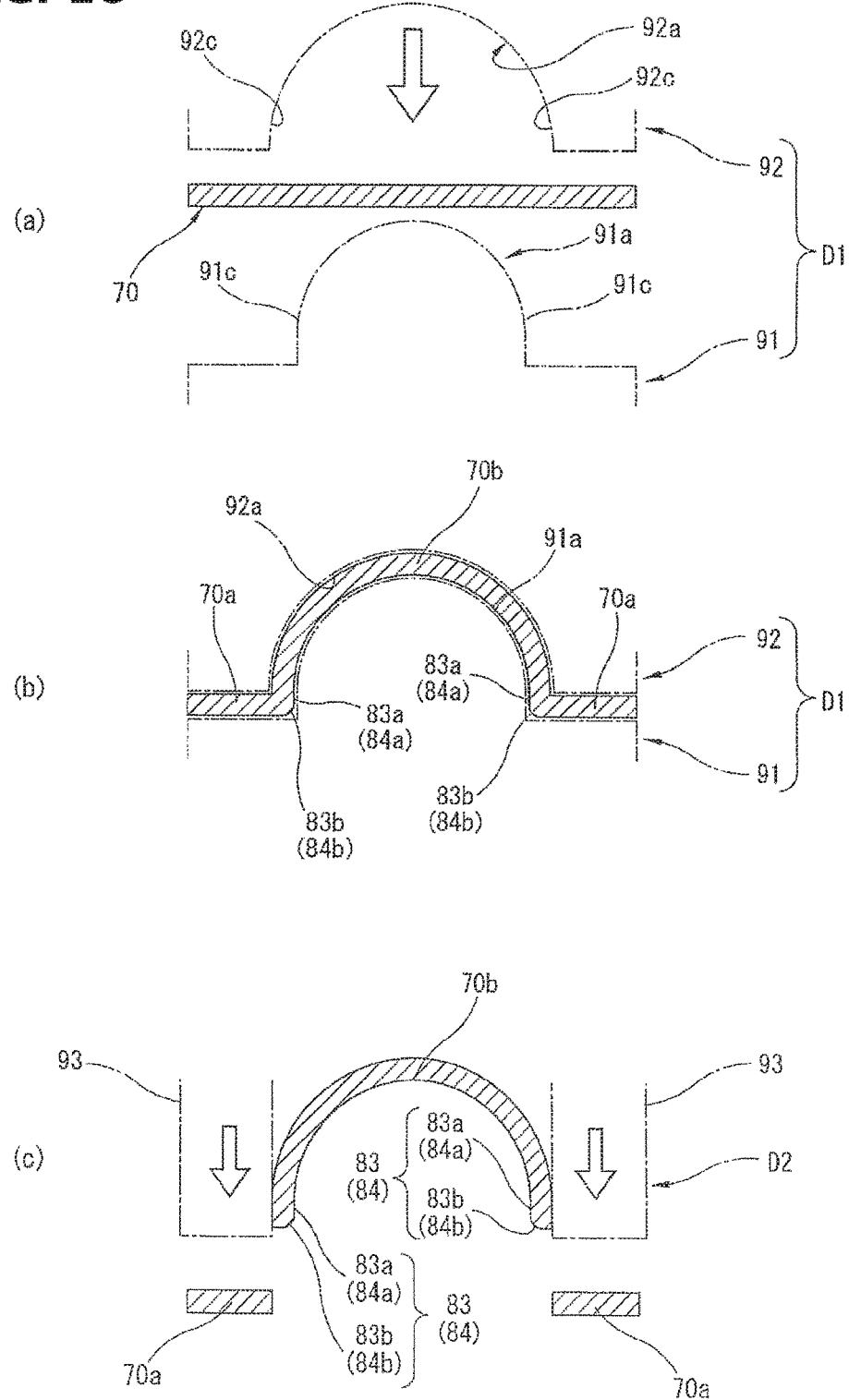
FIG. 16 are views showing a manufacturing process of the tube.

Hereinafter, a manufacturing method of the distinctive tube 44 (in particular, the first and second undercut suppressing portions 83 and 84) in the power steering device according to the present invention is explained with reference to FIG. 16.

First, as shown in FIG. 16(a), a substantially plate-shaped material 70 made from the metal material is set to a first forming die D1 constituted by a male mold (male die) 91 including a raised portion 91a, and a female mold (female die) 92 including a recessed portion 92a.

Next, as shown in FIG. 16(b), this set material 70 is sandwiched by the raised portion 91a and recessed portion 92a while widthwise both end portions 70a and 70a of the material 70 corresponding to the both end edges of the first and second opening portions 81a and 82a are held by the flat portions 91b and 92b formed on the both sides of the raised portion 91a and the recessed portion 92a so as to be directed in the radially outward direction with respect to the center of the imaginary circle VC along the inner circumference edge of the tube 44. With this, a widthwise middle portion 70b of the material 70 is bent into a raised arc shape which is raised in the radially outward direction (first mold).

In this case, that is, when the widthwise middle portion 70b of the material 70 extends in the radially outward direction by the raised portion 91a, the first and second taper portions 83b and 84b are formed. Moreover, the first and second flat portions 83a and 84a are formed by being sandwiched by flat both side surfaces 91c and 92c (cf. FIG. 16(a)) provided to the raised portion 91a and the recessed portion 92a in accordance with the extension of the widthwise middle portion 70b.

Then, the widthwise both end portions 70a and 70a remained at the both side portions of the bending portion 70b are cut by a second forming die D2 Including a pair of punches 93 and 93 (second mold), as shown in FIG. 16(c). With this, the first and second members 81 and 82 including the first and second undercut suppressing portions 83 and 84 are finished.

In the power steering device according to this embodiment, the first insertion portion 71 and the second insertion portion 72 of the tube 44 are inclined, respectively, along the predetermined lead angle of the ball circulation groove 42 with respect to the connection portion 73. Accordingly, it is possible to smooth the movements of the balls 43 between the tube 44 and the ball circulation groove 42.

Furthermore, at the forming of the tube 44, the tube 44 is divided in the circumferential direction. The divided first and second members 81 and 82 are formed by the die forming. Accordingly, it is possible to readily form the tube 44, to improve the productivity, and to decrease the manufacturing cost.

Moreover, in this case, the first and second insertion portions 71 and 72 in the tube 44 are formed to be inclined with respect to the tube 44 in the range where the first opening portion 81a is formed in the entire range of the movement direction of the balls 43 in the first member 81, and where the second opening portion 82a is formed in the entire range of the movement direction of the balls 43 in the second member 82. Accordingly, it is possible to perform the die forming in the entire ranges of the first and second members 81 and 82. Consequently, it is possible to effectively obtain the merits of the die forming such as the improvement of the productivity of the device, and the reduction of the manufacturing cost.

Furthermore, in the dividing structure of the tube 44, the first member 81 and the second member 82 are formed so that the first imaginary surface including the first connection surface 81b and the second imaginary surface including the second connection surface 82b are in the same plane, so that the first and second members 81 and 82 are divided at the single joint surface. Accordingly, it is possible to improve the formability (the moldability) at the die forming of the members 81 and 82, to further improve the productivity of the device, and to further decrease the manufacturing cost.

Moreover, in this embodiment, in the dividing structure of the tube 44, the first member 81 and the second member 82 are formed into the same shape. Accordingly, it is possible to use the same forming die for the both members 81 and 82, and thereby to further decrease the manufacturing cost of the device.

Furthermore, in the dividing structure of the tube 44, the narrow angle θx formed by the first imaginary surface including the first joint surface 81b and the second imaginary surface including the second joint surface 82b is smaller than the summation of the inclination angles θ1 and θ2 of the first and second insertion portions 71 and 72 with respect to the connection portion 73. Accordingly, it is possible to decrease the raised portions and the recessed portions of the dividing surfaces, relative to a case where the dividing surfaces (the joint surfaces of the first and second opening portions 81a and 82a) of the first and second insertion portions 71 and 72 are equally divided into two portions. Consequently, it is possible to improve the formability (moldability) of the die forming of the first and second members 81 and 82. Moreover, in this construction, it is possible to suppress the generation of the undercut, relative to a case where the dividing surfaces of the first and second insertion portions 71 and 72 are in the same plane, and thereby to further improve the formability (moldability) of the first and second members 81 and 82.

Moreover, the first and second members 81 and 82 include, respectively, the first and second undercut suppressing portions 83 and 84 formed on the inner circumference edges on the first and second opening portions 81a and 82a side in the predetermined regions in which the circumferential length of the inner circumference edges in the cross section perpendicular to the movement direction in the predetermined range of the movement directions of the balls 43 is longer than the circumferential lengths of the counter (opposite) members 82 and 81. The first and second undercut suppressing portions 83 and 84 are formed by enlarging the inner circumference edges (on the first and second opening portions 81a and 82a sides) in the radially outward direction beyond the imaginary circle VC along the inner circumference edge of the tube 44. With this, it is possible to suppress the undercut at the molding of the first and second members 81 and 82 by the undercut suppressing portions 83 and 84, and thereby to further improve the formability (moldability) of the first and second members 81 and 82.

Besides, in this case, the shapes of the inner circumference surfaces in the regions confronting the undercut suppressing portions 83 and 84 of the first and second members 81 and 82 are formed along the imaginary circle VC along the inner circumference edge of the tube 44. Accordingly, it is possible to appropriately support the balls 43 within the tube 44 by the inner circumference surfaces of the counter members 82 and 81 confronting the undercut suppressing portions 83 and 84. With this, it is possible to suppress the radial position deviation of the balls 43 within the tube 44, and thereby to further smooth the movements of the balls 43.

Furthermore, in the first and second members 81 and 82, the joint surface CS between the first opening portion 81a and the second opening portion 82a is inclined in the inclination direction of the first and second insertion portions 71 and 72 with respect to the connection portion 73, with respect to the movement direction of the balls 43 in the connection portion 73. Accordingly, it is possible to decrease the portion of the first and second insertion portions 71 and 72 in which the first and second undercut suppressing portions 83 and 84 are needed to be provided.

Moreover, when the first and second undercut suppressing portions 83 and 84 are formed, the widthwise both end portions 70a and 70a of the material 70 which are end portions of the first and second opening portions 81a and 82a are processed to be bent to direct in the radially outward direction with respect to the center of the imaginary circle VC along the inner circumference edge of the tube 44 at the die forming of the first and second members 81 and 82. Accordingly, it is possible to use the shapes after processing as the first and second undercut suppressing portions 83 and 84. Consequently, it is possible to omit labor (trouble) by which new undercut suppressing portions 83 and 84 are formed.

Furthermore, in the tube 44, the first and second members 81 and 82 are provided with the first and second abutment portions 71b and 72b which can be abutted, respectively, on the first and second stepped portions 53 and 63. That is, the first and second abutment portions 71b and 72b extend over (across) the first and second members 81 and 82. Accordingly, it is possible to position the first and second members 81 and 82 in the insertion direction, and thereby to improve the assembling operability of the device.

On the other hand, the first and second guide portions 71a and 72a do not extend across (over) the first and second members 81 and 82. The first guide portion 71a is provided only to the first member 81. The second guide portion 72a is provided only to the second member 82. The first and second guide portions 71a and 72a do not include the joint surface (the dividing surface) of the first and second members 81 and 82. Accordingly, it is possible to suppress the reduction of the strength of the first and second guide portions 71a and 72a, and thereby to ensure the satisfactory durability of the tube 44.

Moreover, the first and second guide portions 71a and 72a are disposed on the counter-abutment portions sides (the first and second connection passage 52 and 62 sides) of the imaginary line VL connecting the pair of the abutment portions 74 and 74 at which the shaft side ball screw groove 42a is abutted on one of the balls 43. Each of the first and second guide portions 71a and 72a has the predetermined length (extension amount) by which the each of the first and second guide portions 71a and 72a does not reach the pair of the abutment portions 74 and 74. Accordingly, it is possible to suppress the scraping of the grease by the pair of the abutment portions 74 and 74, and thereby to ensure the favorable lubrication of the balls 43.

For example, following aspects are conceivable as the power steering device according to the above-described embodiment.

That is, in one aspect, a power steering device includes: a steered shaft arranged to be moved in an axial direction in accordance with a rotation of a steering wheel, and thereby to steer a steered wheel; a nut formed into a cylindrical shape surrounding the steered shaft, and arranged to be rotated relative to the steered shaft; a ball circulation groove including a shaft side ball screw groove having a helical groove shape, and provided on an outer circumference of the steered shaft, and a nut side ball screw groove having a helical groove shape, and provided on an inner circumference of the nut; a plurality of balls disposed within the ball circulation groove to be rolled within the ball circulation groove; a first connection passage including one end side opened on an outer circumference surface of the nut, and the other end side opened on an inner circumference surface of the nut, and opened on the one end side of the ball circulation groove; a second connection passage including one end side opened on the outer circumference surface of the nut, and the other end side opened on the inner circumference surface of the nut, and opened on the other end side of the ball circulation groove; a connection member connecting the first connection passage and the second connection passage to circulate the balls between the first connection passage and the second connection passage; and an electric motor arranged to drive and rotate the nut, and thereby to provide a steering force to the steered shaft; the connection member being constituted by joining a first member which is formed by a die forming, and which includes a first opening portion opened on one side in a circumferential direction around a rotation axis of the nut, and a second member which is formed by the die forming, and which includes a second opening portion that confronts the first opening, and that is opened on the other side in the circumferential direction, the connection member in the joint state including a first insertion portion inserted into the first connection passage, a second insertion portion inserted into the second connection passage, and a connection portion connecting the first insertion portion and the second insertion portion, and the first insertion portion and the second insertion portion being inclined along a lead angle of the ball circulation groove with respect to the connection portion.

In a preferable aspect of the power steering device, the first member and the second member have the same shape.

In another preferable aspect in one of the aspects of the power steering devices, the first connection passage includes a first stepped portion on which an end surface on one side of the connection member is abutted;

the second connection passage includes a second stepped portion on which an end surface on the other side of the connection member is abutted;

the first member includes one end side abutted on the first stepped portion, and the other end side abutted on the second stepped portion; and the second member includes one end side abutted on the first stepped portion, and the other end side abutted on the second stepped portion.

In still another preferable aspect, the shaft side ball screw groove includes a pair of abutment portions abutted on the balls; and the first piece portion and the second piece portion are disposed on a counter-abutment portion side of an imaginary line connecting the pair of the abutment portions.

In still another preferable aspect in one of the aspects of the power steering devices, the first member includes a first undercut suppressing portion provided in a predetermined range of a movement direction of the balls in a region in which a circumferential length of an inner circumference edge in a cross section perpendicular to the movement direction is greater than a circumferential length of the second member, formed by enlarging an inner circumference edge on the first opening portion side in a radially outside direction beyond an imaginary circle along an inner circumference edge of the connection member, and arranged to suppress an undercut at the die forming; and the second member includes a second undercut suppressing portion provided in a predetermined range of a movement direction of the balls in a region in which a circumferential length of the inner circumference edge in the cross section perpendicular to the movement direction is greater than a circumferential length of the first member, formed by enlarging an inner circumference edge on the second opening portion side in the radially outside direction beyond the imaginary circle along the inner circumference edge of the connection member, and arranged to suppress the undercut at the die forming.

In still another preferable aspect in one of the aspects of the power steering devices, the first member and the second member are formed so that a narrow angle formed by a first imaginary surface including a joint surface between the first opening portion and the second opening portion in the first insertion portion, and a second imaginary surface including a joint surface between the first opening portion and the second opening portion in the second insertion portion is greater than a summation of an inclination angle of the first insertion portion with respect to the connection portion, and an inclination angle of the second insertion portion with respect to the connection portion.

In still another preferable aspect in one of the aspects of the power steering devices, the first member includes an inner circumference edge which is in a region confronting the second undercut suppressing portion, and which is formed along an imaginary line along an inner circumference edge of the connection member; and the second member includes an inner circumference edge which is in a region confronting the first undercut suppressing portion, and which is formed along the imaginary line along the inner circumference edge of the connection member.

In still another preferable aspect in one of the aspects of the power steering devices, the first member and the second member are formed by press-molding plate-shaped materials made from metal material;

the first member is formed by bending to direct end portions of the first opening portion in radially outward directions with respect to a center of an imaginary circle along an inner circumference edge of the connection member; and the second member is formed by bending to direct end portions of the second opening portion in the radially outward directions with respect to the center of the imaginary circle along the inner circumference edge of the connection member.

In still another preferable aspect in one of the aspects of the power steering devices, the first member and the second member are formed so that a first imaginary surface including a joint surface between the first opening portion and the second opening portion in the first insertion portion, and a second imaginary surface including a joint surface between the first opening portion and the second opening portion in the second insertion portion are in the same plane.

In still another preferable aspect in one of the aspects of the power steering devices, the first insertion portion and the second insertion portion are formed into inclination shapes with respect to the connection member, in a range where the first opening portion is formed in an entire region of a movement direction of the ball in the first member, and where the second opening portion is formed in an entire region of the movement direction of the ball in the second member.

In still another preferable aspect in one of the aspects of the power steering devices, the first member and the second member are formed so that a joint surface between the first opening portion and the second opening portion is formed to be inclined in inclination directions of the first insertion portion and the second insertion portion with respect to the connection portion, with respect to a movement direction of the ball in the connection portion.

In still another preferable aspect in one of the aspects of the power steering devices, the first connection passage includes a first stepped portion on which an end surface on one side of the connection member is abutted;

the second connection passage includes a second stepped portion on which an end surface on the other side of the connection member is abutted;

the connection member including a first piece portion which is provided in a predetermined range on the shaft side ball screw groove side around the movement direction of the ball in the first insertion portion, and which extends toward the shaft side ball screw groove side, and a first abutment portion which is provided to be apart from the first piece portion, and which is abutted on the first stepped portion;

the connection member including a second piece portion which is provided in a predetermined range on the shaft side ball screw groove side around the movement direction of the ball in the second insertion portion, and which extends toward the ball screw groove side, and a second abutment portion which is apart from the second piece portion, and which is abutted on the second stepped portion;

the first piece portion is provided only to the first member side; and the second piece portion is provided only to the second member side.

From another point of view, a manufacturing method of a power steering device including a steered shaft arranged to be moved in an axial direction in accordance with a rotation of a steering wheel, and thereby to steer a steered wheel, a nut formed into a cylindrical shape surrounding the steered shaft, and arranged to be rotated relative to the steered shaft, a ball circulation groove including a shaft side ball screw groove having a helical groove shape, and provided on an outer circumference of the steered shaft, and a nut side ball screw groove having a helical groove shape, and provided on an inner circumference of the nut, a plurality of balls disposed within the ball circulation groove to be rolled within the ball circulation groove, a first connection passage including one end side opened on an outer circumference surface of the nut, and the other end side opened on an inner circumference surface of the nut, and opened on the one end side of the ball circulation groove, a second connection passage including one end side opened on the outer circumference surface of the nut, and the other end side opened on the inner circumference surface of the nut, and opened on the other end side of the ball circulation groove, a connection member including a first insertion portion inserted into the first connection passage, a second insertion portion inserted into the second connection passage, and a connection portion connecting the first insertion portion and the second connection portion, and connecting the first connection passage and the second connection passage to circulate the balls between the first connection passage and the second connection passage, and an electric motor arranged to drive and rotate the nut, and thereby to provide a steering force to the steered shaft, the manufacturing method includes: die-forming a first member including a first opening portion opened on one side in a circumferential direction around a rotation axis of the nut, and a second member including a second opening portion that confronts the first opening, and that is opened on the other side in the circumferential direction so that the first insertion portion and the second insertion portion are inclined along a lead angle of the ball circulation groove with respect to the connection portion; and joining the first member and the second member to form the connection member.

In a preferable aspect of the power steering device, the first member and the second member have the same shape.

In another preferable aspect in one of the aspects of the power steering devices, the first member includes a first undercut suppressing portion provided in a predetermined range of a movement direction of the balls in a region in which a circumferential length of an inner circumference edge in a cross section perpendicular to the movement direction is greater than a circumferential length of the second member, formed by enlarging an inner circumference edge on the first opening portion side in a radially outside direction beyond an imaginary circle along an inner circumference edge of the connection member, and arranged to suppress an undercut at the die forming; and the second member includes a second undercut suppressing portion provided in a predetermined range of a movement direction of the balls in a region in which a circumferential length of the inner circumference edge in the cross section perpendicular to the movement direction is greater than a circumferential length of the first member, formed by enlarging an inner circumference edge on the second opening portion side in the radially outside direction beyond the imaginary circle along the inner circumference edge of the connection member, and arranged to suppress the undercut at the die forming.

In still another preferable aspect in one of the aspects of the power steering devices, the first member and the second member are formed so that a narrow angle formed by a first imaginary surface including a joint surface between the first opening portion and the second opening portion in the first insertion portion, and a second imaginary surface including a joint surface between the first opening portion and the second opening portion in the second insertion portion is greater than a summation of an inclination angle of the first insertion portion with respect to the connection portion, and an inclination angle of the second insertion portion with respect to the connection portion.

In still another preferable aspect in one of the aspects of the power steering devices, the first member includes an inner circumference edge which is in a region confronting the second undercut suppressing portion, and which is formed along an imaginary line along an inner circumference edge of the connection member; and the second member includes an inner circumference edge which is in a region confronting the first undercut suppressing portion, and which is formed along the imaginary line along the inner circumference edge of the connection member.

In still another preferable aspect in one of the aspects of the power steering devices, the first member and the second member are formed so that a first imaginary surface including a joint surface between the first opening portion and the second opening portion in the first insertion portion, and a second imaginary surface including a joint surface between the first opening portion and the second opening portion in the second insertion portion are in the same plane.

In still another preferable aspect in one of the aspects of the power steering devices, the first insertion portion and the second insertion portion are formed into inclination shapes with respect to the connection member, in a range where the first opening portion is formed in an entire region of a movement direction of the ball in the first member, and where the second opening portion is formed in an entire region of the movement direction of the ball in the second member.

In still another preferable aspect in one of the aspects of the power steering devices, the first member and the second member are formed so that a joint surface between the first opening portion and the second opening portion is formed to be inclined in inclination directions of the first insertion portion and the second insertion portion with respect to the connection portion, with respect to a movement direction of the ball in the connection portion.

The invention claimed is:

1. A power steering device comprising:
    a steered shaft arranged to be moved in an axial direction in accordance with a rotation of a steering wheel, and thereby to steer a steered wheel;
    a nut formed into a cylindrical shape surrounding the steered shaft, and arranged to be rotated relative to the steered shaft;
    a ball circulation groove including a shaft side ball screw groove having a helical groove shape, and provided on an outer circumference of the steered shaft, and a nut side ball screw groove having a helical groove shape, and provided on an inner circumference of the nut;
    a plurality of balls disposed within the ball circulation groove to be rolled within the ball circulation groove;
    a first connection passage including one end side opened on an outer circumference surface of the nut, and the other end side opened on an inner circumference surface of the nut, and opened on the one end side of the ball circulation groove;
    a second connection passage including one end side opened on the outer circumference surface of the nut, and the other end side opened on the inner circumference surface of the nut, and opened on the other end side of the ball circulation groove;
    a connection member connecting the first connection passage and the second connection passage to circulate the balls between the first connection passage and the second connection passage; and
    an electric motor arranged to drive and rotate the nut, and thereby to provide a steering force to the steered shaft;
    the connection member being constituted by joining a first member which is formed by a die forming, and which includes a first opening portion opened on one side in a circumferential direction around a rotation axis of the nut, and a second member which is formed by the die forming, and which includes a second opening portion that confronts the first opening, and that is opened on the other side in the circumferential direction,
    the connection member in the joint state including a first insertion portion inserted into the first connection passage, a second insertion portion inserted into the second connection passage, and a connection portion connecting the first insertion portion and the second insertion portion, and
    the first insertion portion and the second insertion portion being inclined along a lead angle of the ball circulation groove with respect to the connection portion.

2. The power steering device as claimed in claim 1, wherein the first member and the second member have the same shape.

3. The power steering device as claimed in claim 2, wherein the first connection passage includes a first stepped portion on which an end surface on one side of the connection member is abutted;
    the second connection passage includes a second stepped portion on which an end surface on the other side of the connection member is abutted;
    the first member includes one end side abutted on the first stepped portion, and the other end side abutted on the second stepped portion; and
    the second member includes one end side abutted on the first stepped portion, and the other end side abutted on the second stepped portion.

4. The power steering device as claimed in claim 2, wherein the first connection passage includes a first stepped portion on which an end surface on one side of the connection member is abutted;
    the second connection passage includes a second stepped portion on which an end surface on the other side of the connection member is abutted;
    the connection member including a first piece portion which is provided in a predetermined range on the shaft side ball screw groove side around the movement direction of the ball in the first insertion portion, and which extends toward the shaft side ball screw groove side, and a first abutment portion which is provided to be apart from the first piece portion, and which is abutted on the first stepped portion;
    the connection member including a second piece portion which is provided in a predetermined range on the shaft side ball screw groove side around the movement direction of the ball in the second insertion portion, and which extends toward the ball screw groove side, and a second abutment portion which is apart from the second piece portion, and which is abutted on the second stepped portion;
    the first piece portion is provided only to the first member side; and
    the second piece portion is provided only to the second member side.

5. The power steering device as claimed in claim 2, wherein the shaft side ball screw groove includes a pair of abutment portions abutted on the balls; and the first piece portion and the second piece portion are disposed on a counter-abutment portion side of an imaginary line connecting the pair of the abutment portions.

6. The power steering device as claimed in claim 1, wherein the first member includes a first undercut suppressing portion provided in a predetermined range of a movement direction of the balls in a region in which a circumferential length of an inner circumference edge in a cross section perpendicular to the movement direction is greater than a circumferential length of the second member, formed by enlarging an inner circumference edge on the first opening portion side in a radially outside direction beyond an imaginary circle along an inner circumference edge of the connection member, and arranged to suppress an undercut at the die forming; and
    the second member includes a second undercut suppressing portion provided in a predetermined range of a movement direction of the balls in a region in which a circumferential length of the inner circumference edge in the cross section perpendicular to the movement direction is greater than a circumferential length of the first member, formed by enlarging an inner circumference edge on the second opening portion side in the radially outside direction beyond the imaginary circle along the inner circumference edge of the connection member, and arranged to suppress the undercut at the die forming.

7. The power steering device as claimed in claim 6, wherein the first member and the second member are formed so that a narrow angle formed by a first imaginary surface including a joint surface between the first opening portion and the second opening portion in the first insertion portion, and a second imaginary surface including a joint surface between the first opening portion and the second opening portion in the second insertion portion is greater than a summation of an inclination angle of the first insertion portion with respect to the connection portion, and an inclination angle of the second insertion portion with respect to the connection portion.

8. The power steering device as claimed in claim 6, wherein the first member includes an inner circumference edge which is in a region confronting the second undercut suppressing portion, and which is formed along an imaginary line along an inner circumference edge of the connection member; and the second member includes an inner circumference edge which is in a region confronting the first undercut suppressing portion, and which is formed along the imaginary line along the inner circumference edge of the connection member.

9. The power steering device as claimed in claim 6, wherein the first member and the second member are formed by press-molding plate-shaped materials made from metal material;

the first member is formed by bending to direct end portions of the first opening portion in radially outward directions with respect to a center of an imaginary circle along an inner circumference edge of the connection member; and the second member is formed by bending to direct end portions of the second opening portion in the radially outward directions with respect to the center of the imaginary circle along the inner circumference edge of the connection member.

10. The power steering device as claimed in claim 1, wherein the first member and the second member are formed so that a first imaginary surface including a joint surface between the first opening portion and the second opening portion in the first insertion portion, and a second imaginary surface including a joint surface between the first opening portion and the second opening portion in the second insertion portion are in the same plane.

11. The power steering device as claimed in claim 10, wherein the first insertion portion and the second insertion portion are formed into inclination shapes with respect to the connection member, in a range where the first opening portion is formed in an entire region of a movement direction of the ball in the first member, and where the second opening portion is formed in an entire region of the movement direction of the ball in the second member.

12. The power steering device as claimed in claim 10, wherein the first member and the second member are formed so that a joint surface between the first opening portion and the second opening portion is formed to be inclined in inclination directions of the first insertion portion and the second insertion portion with respect to the connection portion, with respect to a movement direction of the ball in the connection portion.

13. A manufacturing method of a power steering device including a steered shaft arranged to be moved in an axial direction in accordance with a rotation of a steering wheel, and thereby to steer a steered wheel, a nut formed into a cylindrical shape surrounding the steered shaft, and arranged to be rotated relative to the steered shaft, a ball circulation groove including a shaft side ball screw groove having a helical groove shape, and provided on an outer circumference of the steered shaft, and a nut side ball screw groove having a helical groove shape, and provided on an inner circumference of the nut, a plurality of balls disposed within the ball circulation groove to be rolled within the ball circulation groove, a first connection passage including one end side opened on an outer circumference surface of the nut, and the other end side opened on an inner circumference surface of the nut, and opened on the one end side of the ball circulation groove, a second connection passage including one end side opened on the outer circumference surface of the nut, and the other end side opened on the inner circumference surface of the nut, and opened on the other end side of the ball circulation groove, a connection member including a first insertion portion inserted into the first connection passage, a second insertion portion inserted into the second connection passage, and a connection portion connecting the first insertion portion and the second insertion portion, and connecting the first connection passage and the second connection passage to circulate the balls between the first connection passage and the second connection passage, and an electric motor arranged to drive and rotate the nut, and thereby to provide a steering force to the steered shaft, the manufacturing method comprising:

die-forming a first member including a first opening portion opened on one side in a circumferential direction around a rotation axis of the nut, and a second member including a second opening portion that confronts the first opening, and that is opened on the other side in the circumferential direction so that the first insertion portion and the second insertion portion are inclined along a lead angle of the ball circulation groove with respect to the connection portion; and joining the first member and the second member to form the connection member.

14. The manufacturing method of the power steering device as claimed in claim 13, wherein the first member and the second member have the same shape.

15. The manufacturing method of the power steering device as claimed in claim 13, wherein the first member includes a first undercut suppressing portion provided in a predetermined range of a movement direction of the balls in a region in which a circumferential length of an inner circumference edge in a cross section perpendicular to the movement direction is greater than a circumferential length a of the second member, formed by enlarging an inner circumference edge on the first opening portion side in a radially outside direction beyond an imaginary circle along an inner circumference edge of the connection member, and arranged to suppress an undercut at the die forming; and the second member includes a second undercut suppressing portion provided in a predetermined range of a movement direction of the balls in a region in which a circumferential length of the inner circumference edge in the cross section perpendicular to the movement direction is greater than a circumferential length of the first member, formed by enlarging an inner circumference edge on the second opening portion side in the radially outside direction beyond the imaginary circle along the inner circumference edge of the connection member, and arranged to suppress the undercut at the die forming.

16. The manufacturing method of the power steering device as claimed in claim 15, wherein the first member and the second member are formed so that a narrow angle formed by a first imaginary surface including a joint surface between the first opening portion and the second opening portion in the first insertion portion, and a second imaginary surface including a joint surface between the first opening portion and the second opening portion in the second insertion portion is greater than a summation of an inclination angle of the first insertion portion with respect to the connection portion, and an inclination angle of the second insertion portion with respect to the connection portion.

17. The manufacturing method of the power steering device as claimed in claim 15, wherein the first member includes an inner circumference edge which is in a region confronting the second undercut suppressing portion, and which is formed along an imaginary line along an inner circumference edge of the connection member; and the second member includes an inner circumference edge which is in a region confronting the first undercut suppressing portion, and which is formed along the imaginary line along the inner circumference edge of the connection member.

18. The manufacturing method of the power steering device as claimed in claim 13, wherein the first member and the second member are formed so that a first imaginary surface including a joint surface between the first opening portion and the second opening portion in the first insertion portion, and a second imaginary surface including a joint surface between the first opening portion a and the second opening portion in the second insertion portion are in the same plane.

19. The manufacturing method of the power steering device as claimed in claim 18, wherein the first insertion portion and the second insertion portion are formed into inclination shapes with respect to the connection member, in a range where the first opening portion is formed in an entire region of a movement direction of the ball in the first member, and where the second opening portion is formed in an entire region of the movement direction of the ball in the second member.

20. The manufacturing method of the power steering device as claimed in claim 18, wherein the first member and the second member are formed so that a joint surface between the first opening portion and the second opening portion is formed to be inclined in inclination directions of the first insertion portion and the second insertion portion with respect to the connection portion, with respect to a movement direction of the ball in the connection portion.

* * * * *